US011872797B2

(12) United States Patent
Saniei et al.

(10) Patent No.: US 11,872,797 B2
(45) Date of Patent: Jan. 16, 2024

(54) METHOD OF MAKING FLAT FOAM SHEET COMPRISING RECYCLED PET AND THE PRODUCT RESULTING THEREFROM

(71) Applicant: MuCell Extrusion, LLC, Woburn, MA (US)

(72) Inventors: Mehdi Saniei, Belmont, MA (US); Mark E. Lindenfelzer, Milton, MA (US); James K. Sakorafos, Shrewsbury, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 0 days.

(21) Appl. No.: 17/575,419

(22) Filed: Jan. 13, 2022

(65) Prior Publication Data

US 2022/0242088 A1     Aug. 4, 2022

Related U.S. Application Data

(60) Provisional application No. 63/136,891, filed on Jan. 13, 2021.

(51) Int. Cl.

| | |
|---|---|
| *B32B 27/20* | (2006.01) |
| *B32B 5/18* | (2006.01) |
| *B32B 27/36* | (2006.01) |
| *B32B 27/06* | (2006.01) |
| *B32B 27/30* | (2006.01) |
| *B29C 48/21* | (2019.01) |
| *B29C 48/00* | (2019.01) |
| *B29K 67/00* | (2006.01) |
| *B29K 23/00* | (2006.01) |
| *B29K 105/26* | (2006.01) |
| *B29K 105/04* | (2006.01) |

(52) U.S. Cl.
CPC ............ *B32B 5/18* (2013.01); *B29C 48/0012* (2019.02); *B29C 48/21* (2019.02); *B32B 27/065* (2013.01); *B32B 27/20* (2013.01); *B32B 27/306* (2013.01); *B32B 27/36* (2013.01); *B29K 2023/086* (2013.01); *B29K 2067/003* (2013.01); *B29K 2105/04* (2013.01); *B29K 2105/26* (2013.01); *B32B 2250/24* (2013.01); *B32B 2266/0264* (2013.01); *B32B 2266/08* (2013.01); *B32B 2272/00* (2013.01); *B32B 2307/4026* (2013.01); *B32B 2307/54* (2013.01); *B32B 2307/72* (2013.01); *B32B 2307/732* (2013.01)

(58) Field of Classification Search
CPC ... B29C 48/0012; B29C 48/21; B29C 48/295; B29C 48/297; B29C 48/305; B29C 48/387; B29C 48/49; B29C 48/495; B29C 48/92; B29K 2023/086; B29K 2067/003; B29K 2105/04; B29K 2105/26; B32B 2250/24; B32B 2266/0264; B32B 2266/08; B32B 2266/104; B32B 2272/00; B32B 2307/4026; B32B 2307/54; B32B 2307/546; B32B 2307/718; B32B 2307/72; B32B 2307/732; B32B 2439/70; B32B 27/065; B32B 27/08; B32B 27/18; B32B 27/20; B32B 27/306; B32B 27/36; B32B 5/18
See application file for complete search history.

(56) References Cited

U.S. PATENT DOCUMENTS

| | | |
|---|---|---|
| 5,391,582 A | 2/1995 | Muschiatti et al. |
| 5,422,381 A | 6/1995 | Al Ghatta et al. |
| 2012/0228793 A1 | 9/2012 | Lindenfelzer et al. |
| 2016/0089852 A1 | 3/2016 | Lindenfelzer et al. |
| 2019/0111593 A1 | 4/2019 | Li |
| 2019/0127543 A1 * | 5/2019 | Harfmann ............... B29C 48/85 |
| 2020/0171786 A1 | 6/2020 | Saniei et al. |
| 2020/0361184 A1 | 11/2020 | Saniei et al. |
| 2020/0361185 A1 | 11/2020 | Saniei et al. |
| 2021/0101372 A1 | 4/2021 | Saniei et al. |

OTHER PUBLICATIONS

Invitation to Pay Additional Fees for International Application No. PCT/US2022/012355 dated Mar. 28, 2022.
International Search Report and Written Opinion for International Application No. PCT/US2022/012355 dated Jun. 3, 2022.
International Preliminary Report on Patentability (Chapter 1) for International Application No. PCT/US2022/012355 dated Jul. 27, 2023.

* cited by examiner

*Primary Examiner* — Lawrence D Ferguson
(74) *Attorney, Agent, or Firm* — Wolf, Greenfield & Sacks, P.C.

(57) ABSTRACT

A method of making multilayer foam sheet from recycled polyester sources, which may be used for packaging applications. The method comprises a co-extrusion system comprising at least two single screw extruders. A low I.V. polyester feedstock comprising up to 100% of the polyester flakes from recycled sources with an intrinsic viscosity (I.V.) of lower than 0.8 dL/g as measured by ASTM D4603-18 is directly being fed into the extruders. Supercritical physical blowing agent is introduced into the melted polyester feedstock in at least one of the extruders wherein the processing temperature is in the range of 15% lower than the melting temperature and 15% higher than the melting temperature. Then, coextruding the feedstock from the extruders of the co-extrusion system through a flat sheet die to make a multilayer foam sheet, wherein at least one layer is a foam layer comprising low I.V. polyester.

11 Claims, No Drawings

METHOD OF MAKING FLAT FOAM SHEET COMPRISING RECYCLED PET AND THE PRODUCT RESULTING THEREFROM

RELATED APPLICATION

This application claims priority to U.S. provisional patent application No. 63/136,891 filed on Jan. 13, 2021, which is incorporated herein by reference in its entirety.

FIELD

This invention relates to a method of making multilayer foam sheet from recycled polyester sources, which may be used for packaging applications.

PET is considered a budget-friendly and widespread commercially available material that possesses high modulus, high distortion temperature, is chemically resistant, and can be fully recyclable. PET is an auspicious material with a high potential in various markets, specifically in the packaging industry, providing to find a solution or remedy to deal with the shortcomings of the base resin. For instance, slow crystallization kinetics, hygroscopicity, which results in hydrolysis during the processing at high temperature, brittle fracture behavior, oxidation during processing. Moreover, PET can be further crystallized during heat treatment, so-called cold crystallization, and is very brittle after crystallization. PET becomes rubbery at 80° C., which makes the use of PET in many applications not feasible. So, to be able to use PET for applications in the packaging industry that needs to withstand high temperature and maintain dimensional stability, the PET structure can be reinforced with PET crystals that are stable up to 250° C., which results in the package maintaining its geometry and integrity when the temperature exceeds 80° C.; hence the package should be highly crystalline. Therefore, it is beneficial to control the crystallization kinetics by adding nucleating agents, crystal growth promoters, as well as adjusting the cooling rate to induce crystals and precisely control the needed degree of crystallinity to develop certain targeted properties in the finished products.

PET from recycled sources (rPET) such as post-industrial and post-consumer polyester, PET process regrinds, and recycled PET bottle flakes have captivated much attention due to the recycling ability of PET resin, which can result in a sustainable process. For example, collected post-consumer PET bottles first undergo a reclaiming process wherein they are separated and sorted from non-PET bottles, also by color. Afterward, they are ground up to small pieces with an average flake size typically between 6-14 mm. Labels, label adhesives, lids, base cups, some foreign plastic layers, and coatings, as well as dirt and residual content, are then removed from the bottle material and washed, resulting in a product, so-called bottle flakes.

However, the difficulties in the processing of rPET and the number of pre-processing steps can result in a costly process. Conventional virgin PET resins and rPET do not possess the rheological properties well suited for extrusion foaming with a physical blowing agent where high viscosity and melt strength are decisive parameters. The inherent low melt strength at high processing temperatures in unmodified PET can cause a significant amount of cell rupture and coalescence in the foaming process. On the other hand, one of the major disadvantages of PET is the hygroscopicity and consequently hydrolysis during the extrusion process at a high temperature, which results in the intrinsic viscosity (I.V.) of PET to drop significantly. This makes the processing of PET with a low I.V. even more complicated, specifically for foaming.

So, usually for applications such as extrusion blow molding and foaming, PET resins are being modified through chain extension and branching reactions either through reactive extrusion by adding bi- or polyfunctional reagents, e.g., thickening agents, or solid-state polycondensation, both of which can result in improved rheological properties and melt strength.

Nevertheless, practically the application of the compounds from reactive extrusion is limited because of the high amount of severe side reactions or the formation of detrimental byproducts. As the molecular weight of PET increases during the reactive chain coupling process, the shear-induced heating increases dramatically. Moreover, the excessive amount of chain extender during reactive extrusion may result in unfavorable molecular branching and even crosslinking, which hence may severely hinder the formation and growth of crystals leading to a decline in properties and the performance of the product. Although standard melt-state-polymerization can yield a modified PET compound with a molecular weight in the range of, e.g., number average of about $M_n=\sim15000$ to $\sim25000$, but for the applications such as injection molding, blow molding, and foaming, higher molecular weight, e.g., number average more than about $M_n=\sim30000$ is preferred and in some cases is needed which is feasibly achievable utilizing solid-state polymerization.

The solid-stating process, which is conventionally performed in a crystallizer and a polymerization reactor at a high temperature and a high vacuum level for an extended period of time, is characterized as very high capital and high production costs and is a very time-intensive and energy-intensive batch process. Initially in the melt phase, and then after pelletizing and granulating the amorphous pellets, a number average of about $M_n=\sim16000$ to $\sim19000$, that is, the intrinsic viscosity of about 0.58 to 0.68, is being achieved. Then, in the first step of solid-state polycondensation, the degree of crystallinity of the melt-polymerized pellets or chips will be increased up to about 40% inside a crystallizer. In the second step, the crystallized chips or pellets undergo solid-state polycondensation inside a polymerization reactor under the vacuum or inert gas condition at an elevated temperature from about 180° C. to 240° C. and requires a residence time of about 12 hours. In this process, a number average values of about $M_n=\sim27000$ to $\sim38000$, that is, the I.V. of about 0.9 to 1.2, as measured by ASTM D4603-18, can be achieved. Typically, in the solid-state polycondensation process, every 0.1 dL/g increase in intrinsic viscosity needs about 10 hours. Although various types of additives have been developed as an accelerator to reduce the resident time, still more than 50% reduction in resident time, e.g., less than about 5 hours for every 0.1 dL/g increase of I.V., has not been practically and industrially materialized yet.

In their patent U.S. Pat. No. 5,422,381, incorporated herein its entirety, Al Ghatta et al. disclosed a process to make a low-density cellular polyester after modifying the I.V. of the PET resins having the I.V. of greater than 0.8 dl/g by solid-state polycondensation using pyromellitic dianhydride.

The U.S. Pat. No. 5,391,582, incorporated herein its entirety, discloses a process to make PET foam using a blend of highly branched PET and recycled PET and incorporating a chain extender or a crosslinking agent to the melt stream.

So, It would be beneficial to innovate a process of making multilayer foam sheet comprising up to 100% PET from recycled sources (rPET), e.g., PET bottle flakes, wherein the rPET flakes can be fed directly into the processing equipment without the need for any polymer structure modification, either through solid-state polycondensation or melt reactive extrusion to increase the I.V., e.g., by the inclusion of any viscosity enhancing agents, thickening agent, cross-linking agent, chain branching agent, chain extending agent, etc. This can result in eliminating the need for utilizing the costly equipment, e.g., a solid-state reactor, and avoid very high capital and high production costs, and time and energy-intensive batch process.

SUMMARY

A method of making a multilayer foam sheet using low I.V. polyester feedstock, which may be used for packaging application, is described herein. The sheet can have a smooth surface, resulting in superior printing quality and high enough bending stiffness to replace the kinds of paper boards that are currently used in the packaging industry.

In one aspect, a method of making a multilayer foam sheet is provided. The method comprises providing a co-extrusion system comprising at least two single screw extruders. The method further comprises feeding low I.V. polyester feedstock comprising polyester flakes from recycled sources, wherein up to 100% of the polyester in the feedstock is comprises polyester flakes from recycled sources, into one of the extruders. The aforesaid low I.V. polyester feedstock has an intrinsic viscosity (I.V.) of lower than 0.8 dL/g as measured by ASTM D4603-18. The method also comprises introducing supercritical physical blowing agent into melted polyester feedstock in at least one of the extruders. The method further comprises processing the polyester feedstock at a processing temperature in the range of 15% lower than the melting temperature and 15% higher than the melting temperature; and co-extruding the polyester feedstock from the extruders of the co-extrusion system through a flat sheet die to make a multilayer foam sheet, wherein at least one layer is a foam layer comprising low I.V. polyester.

In another aspect, a co-extruded lightweight multilayer foam sheet is provided. The sheet comprises at least one foam layer comprising rPET, including a plurality of cells, wherein at least 10% of the cells are closed cells, and two or more solid layers, each solid layer comprising PET. The sheet has an overall thickness equal to or greater than 5 mils. The sheet has a bending stiffness value of greater than 20 in Taber stiffness unit configuration according to TAPPI/ANSI T 489 om-15, and the ratio of the mass per unit area (the mass of a unit area of the sheet in gram per meter-squared ($gr/m^2$)) over the stiffness value in Taber unit configuration is equal to or less than 20.

In another aspect, A co-extruded lightweight multilayer foam sheet is provided. The sheet comprises at least one foam layer comprising rPET, including a plurality of cells, wherein at least 10% of the cells are closed cells, and two or more solid layers, comprising PET. The sheet has an overall thickness equal to or greater than 5 mils. The sheet has an average Sheffield smoothness of less than 100, according to TAPPI T 538.

Other aspects, embodiments, advantages, and features will become apparent from the following detailed description.

DETAILED DESCRIPTION

The singular forms "a," "an," and "the" include plural referents unless the context clearly dictates otherwise.

All ranges disclosed herein are inclusive of the recited endpoint and independently combinable (for example, the range of the expansion ratio of the foamed layer from 1 to 9" is inclusive of the endpoints, 1 and 9, and all the intermediate values. In the same context, for example, an I.V. greater than about 0.55 dL/g is inclusive of the endpoint, 0.55 dL/g.)

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute value of the two endpoints.

As used herein, the term "lightweight" refers to the bulk density value of the products described herein being less than, or equal to, the density of their solid counterpart made from the associated base virgin resin, or the density of the associated base virgin resin. For example, in some embodiments, the bulk density values of the products of this invention can be 1.05 $gr/cm^3$, which is less than the density value of the associated base virgin resin of 1.38 $gr/cm^3$ or less than the bulk density value of 1.38 $gr/cm^3$ of its solid counterpart made from the associated base virgin resin.

As used herein, the term "low I.V. polyester" refers to the Intrinsic Viscosity of the polyester being lower than 0.8 dL/g as measured by ASTM D4603-18. In some embodiments, the low I.V. polyester has an intrinsic viscosity of polyester that is less than 0.7 dL/g as measured by ASTM D4603-18. In some embodiments the low I.V. polyester has an intrinsic viscosity of polyester that is less than 0.6 dL/g as measured by ASTM D4603-18.

As used herein, the term "melting temperature" refers to the peak melting temperature of the polymer as measured by Differential Scanning calorimetry (DSC) according to the ASTM D3418.

As used herein, the term "processing temperature" refers to the temperature of the melt measured at the entrance of the extrusion die. In some embodiments, the said temperature may be measured at the exit of the extruder or at the last heating zone of the extruder.

As it was described earlier, when the low I.V. polyester, (i.e., an I.V. lower than 0.8 dL/g as measured by ASTM D4603-18), is being processed at conventional processing temperatures, it hardly possesses the rheological properties that can result in high enough melt strength for extrusion foaming applications. The conventional processing temperature of PET in extrusion is the combination of temperatures of different zones of the extruder which are generally far above the melting temperature of PET which, typically in most cases, is about 250° C. The processing temperature of the PET refers to the temperature of the melt measured at the entrance of the extrusion die, and is typically far above the aforesaid melting temperature. In the foam extrusion processing of PET, having a low melt strength can cause a considerable amount of cell coalescence and cell wall rupture during foaming, which results in the cellular structure collapsing when foaming occurs. One conventional solution is to modify the molecular structure of the polyester to enhance the melt strength. So, the polyester feedstock can undergo any of the aforementioned I.V. increasing methods, e.g., solid-state polycondensation or reactive melt extrusion with additives to induce chain extension or chain branching or crosslinking.

On the other hand, the rheological properties of thermoplastics, including polyester resins, e.g., PET, is highly dependent on the processing temperature and pressure; hence, obviously, the resin shows a higher melt strength as the temperature decreases and as the pressure increases. The processing of PET at far lower temperature than its conventional processing temperature, e.g., in some cases lower than the melting temperature of PET, however, has not been industrially feasible yet.

Herein, a method of making a multilayer foam sheet using low I.V. polyester feedstock, e.g., an I.V. similar to or lower than that of the bottle grade PET, e.g., a polyester feedstock from recycled sources, is disclosed wherein the said feedstock may not undergo any pre-processing step to increase the I.V. through molecular structure manipulation, e.g., solid-state polycondensation or reactive melt extrusion. The said method comprises the processing of the said feedstock at a significantly lower temperature than the conventional processing temperature of polyester, in some cases, lower than the melting temperature of PET, whereby a high enough melt strength can be held for the formation of a cellular structure. In some embodiment, the processing temperature may be in the range of 15% lower than the and 15% higher than the melting temperature. In some embodiment, the processing temperature may be in the range of 10% lower than the melting temperature and 10% higher than the melting temperature. In some embodiment, the processing temperature may be in the range of 5% lower than the melting temperature and 5% higher than the melting temperature. In some embodiment, the processing temperature is the peak melting temperature. Also, in some embodiments, the said method comprises the pressure to build up inside the processing equipment, e.g., inside the single screw extruder. The said described processing method comprises the inclusion of an appropriate amount of supercritical physical blowing agent, e.g., nitrogen or carbon dioxide or a mixture of two, into the system.

The present disclosure relates to a method of making a multilayer PET foam sheet comprising low I.V. polyester feedstock. In some embodiments, the feedstock comprises more than 50% recycled flakes produced from recycled PET sources, post-industrial waste, process regrind, and post-consumer regrind, e.g., post-consumer PET bottle flakes. In some embodiments, the feedstock comprises more than 75% recycled flakes produced from recycled PET sources. In some embodiments, the feedstock comprises more than 90% (e.g., up to 100%) recycled flakes produced from recycled PET sources. In some embodiments, the polyester feedstock may have an I.V. greater than about 0.55 dL/g. In some embodiments, the polyester feedstock may have an I.V. greater than about 0.65 dL/g. In some embodiments, the polyester feedstock may have an I.V. greater than about 0.75 dL/g. In some preferred embodiments, the polyester feedstock may have an I.V. of about 0.6 to 0.8 dL/g.

In some embodiments, the method of producing a multilayer PET foam sheet comprises crystallizing the said low intrinsic viscosity feedstock in a crystallizer. The crystallization can prevent agglomeration when the said feedstock undergoes the drying process wherein the moisture content of the said feedstock can be significantly reduced, e.g., to less than 50 ppm, e.g., after 4-6 hours in the drying hopper at 325-350° F.

In some embodiments, the method of producing a multilayer PET foam sheet comprises pelletizing the said low intrinsic viscosity feedstock.

The starting formulation which may be used in the said method of producing multilayer PET foam sheet comprises up to 100% of the said feedstock, e.g., crystallized and dried recycled PET flakes, which may be directly fed into the processing machine, e.g., the hopper of an extruder.

In some embodiments, the method of producing multilayer PET foam sheet comprises co-extrusion of multiple solid and foam layers produced from the said feedstock through a multilayer co-extrusion system and die, e.g., flat sheet die. The said co-extrusion processing system to produce multilayer PET foam sheet from the said feedstock comprises multiple single screw extruders connected to a multilayer sheet die, in some cases, multi manifold sheet dies, in some cases, sheet dies with co-ex block/combining block. In some preferred embodiments, each extruder in the said co-extrusion processing system might include a screen changer. In some embodiments, a gear pump may be included.

In some embodiments, the said single screw extruders comprises a cavity transfer mixer, e.g., MuCell Transfer Mixer (MTM) from MuCell Extrusion LLC, as an extension to the extruder's barrel wherein the temperature of the said cavity transfer mixer could be accurately controlled within ±1° C.

In some embodiments, the said co-extrusion processing system comprises a single screw extruder with a cavity transfer mixer, e.g., MuCell Transfer Mixer (MTM) from MuCell Extrusion LLC, as an extension to the extruder's barrel wherein the said cavity transfer mixer comprises an injector, e.g., to introduce physical blowing agents such as nitrogen or carbon dioxide, wherein the temperature of the said cavity transfer mixer could be accurately controlled within ±1° C.

In some embodiments, the said co-extrusion processing system consists of a described sheet die and two single screw extruders, wherein at least one of the extruders includes a cavity transfer mixer, e.g., MuCell Transfer Mixer (MTM) from MuCell Extrusion LLC, as an extension to the extruder's barrel wherein the said cavity transfer mixer comprises an injector, e.g., to introduce physical blowing agents such as nitrogen, carbon dioxide, or a mixture of two, wherein the temperature of the said cavity transfer mixers could be accurately controlled within ±1° C.

In some embodiments, the said co-extrusion processing system consists of a described sheet die and three single-screw extruders, wherein at least one of the extruders includes a cavity transfer mixer, e.g., MuCell Transfer Mixer (MTM) from MuCell Extrusion LLC, as an extension to the extruder's barrel wherein the said cavity transfer mixer comprises an injector, e.g., to introduce physical blowing agents such as nitrogen, carbon dioxide, or a mixture of two, wherein the temperature of the said cavity transfer mixers could be accurately controlled within ±1° C.

It should be understood that other configurations of extruders in the said co-extrusion processing system may be possible.

In some cases, a flat three-layer PET foam sheet may be produced comprising a foam core layer (e.g., comprising rPET) and two solid layers (e.g., comprising PET) each one on respective opposite side of the foam layer, and the sheet has a thickness of greater than 5 mils.

In some cases, a flat four-layer PET foam sheet may be produced comprising a foam core layer (e.g., comprising rPET) and two solid layers (e.g., comprising rPET), each one on respective opposite sides of the core layer, and one solid layer (e.g., comprising PET) on one side of the core layer.

In some cases, a flat five-layer PET foam sheet may be produced comprising a foam core layer (e.g., comprising rPET) and at least two solid layers (e.g., comprising PET), each one on respective opposite sides of the core layer, and at least one solid layer (e.g., comprising rPET), each one between the foam layer and solid skin layer. In some cases, a flat five-layer PET foam sheet may be produced comprising a solid core layer (e.g., comprising rPET) and at least two solid layers (e.g., comprising PET), each one on respective opposite sides of the core layer, and at least two foam layers (e.g., comprising rPET), each one between the core layer and solid skin layer, and the sheet has a thickness of greater than 5 mils.

It should be understood that other layer configurations may be possible.

In some embodiments, the I.V. of the resin used in one or more of the solid layers is at least 0.1 dL/g more than the I.V. of the resin that is used in the foam layers. In some embodiments, the I.V. of the resin used in one or more of the solid layers is at least 0.15 dL/g more than the I.V. of the resin that is used in the foam layers. In some embodiments, the I.V. of the resin used in one or more of the solid layers is at least 0.2 dL/g more than the I.V. of the resin that is used in the foam layers. In some embodiments, the I.V. of the resin used in one or more of the solid layers is at least 0.25 dL/g more than the I.V. of the resin that is used in the foam layers. In some embodiments, the I.V. of the resin used in one or more of the solid layers is at least 0.3 dL/g more than the I.V. of the resin that is used in the foam layers. In some embodiments, the I.V. of the resin used in one or more of the solid layers is at least 0.35 dL/g more than the I.V. of the resin that is used in the foam layers.

In some embodiments, at least one of the outmost solid layers comprises a virgin PET resin, wherein the I.V. of the said resin is at least 0.1 dL/g more than the I.V. of the rPET resin that is used in the foam layers; in some cases, 0.15 dL/g more; in some cases, 0.2 dL/g more; in some cases, 0.25 dL/g more; in some cases, 0.3 dL/g more; in some cases, 0.35 dL/g more; in some cases, 0.4 dL/g more; in some cases, 0.45 dL/g more; and in some cases, 0.5 dL/g more than the I.V. of the rPET resin that is used in the foam layers.

In some preferred embodiments the method of producing the multilayer PET foam sheet comprises maintaining the temperature of the said transfer mixer into which a supercritical gas may be injected, e.g., MuCell Transfer Mixer (MTM) from MuCell extrusion LLC, at a temperature far lower than the conventional processing temperature of PET, e.g., in some cases, below the melting temperature and above the crystallization temperature of PET, and in some cases, in the range of 15% lower than the melting temperature and 15% higher than the melting temperature. In some embodiments, in the method of producing the multilayer foam sheet the pressure inside the cavity transfer mixer, e.g. MuCell Transfer Mixer (MTM) from MuCell extrusion LLC, increases, e.g., greater than 200 bar, in some cases, greater than 240 bar, in some cases, greater than 300 bar, so the high pressure combined with the lower processing temperature contributes in maintaining the appropriate amount of melt strength for foaming.

Generally, a small concentration of byproducts, e.g., acetaldehyde (A.A.), resulting from the degradation of PET can affect the taste of the food in food packaging applications when the food is in direct contact with the package, and the recycled bottle flakes of PET might have a higher amount of acceptable A.A. compared to the virgin PET. So, in some embodiments, the method of producing multilayer PET foam sheet comprises the co-extrusion of a solid skin layer from a virgin food-grade PET feedstock, e.g., an FDA-approved PET resin, wherein the said solid skin has a thickness of greater than 2 microns. In some embodiment, the method of producing multilayer PET foam sheet comprises the use of up to 100% recycled PET flakes produced from recycled PET sources in at least one of the middle layers excluding both solid skin layers. In some embodiment, the method of producing multilayer PET foam sheet comprises the use of up to 100% recycled PET flakes produced from recycled PET sources in at least one of the foam layers.

In some embodiment, the process to produce the described multilayer PET foam sheet may utilize an appropriate amount of supercritical gas, for example, below 1 percent by weight, as a processing aid and blowing agent. In some embodiments, the process to produce the described multilayer PET foam sheet comprises utilizing less than 0.9 percent by weight of the supercritical blowing agent. In some embodiments, the process to produce the described multilayer PET foam sheet comprises utilizing less than 0.8 percent by weight of the supercritical blowing agent. In some embodiments, the process to produce the described multilayer PET foam sheet comprises utilizing less than 0.7 percent by weight of the supercritical blowing agent. In some embodiments, the process to produce the described multilayer PET foam sheet comprises utilizing less than 0.6 percent by weight of the supercritical blowing agent. In some embodiments, the process to produce the described multilayer PET foam sheet comprises utilizing less than 0.5 percent by weight of the supercritical blowing agent. In some embodiments, the process to produce the described multilayer PET foam sheet comprises utilizing less than 0.4 percent by weight of the supercritical blowing agent. In some embodiments, the process to produce the described multilayer PET foam sheet comprises utilizing less than 0.3 percent by weight of the supercritical blowing agent. In some embodiments, the process to produce the described multilayer PET foam sheet comprises utilizing less than 0.2 percent by weight of the supercritical blowing agent. In some embodiments, the process to produce the described multilayer PET foam sheet comprises utilizing less than 0.1 percent by weight of the supercritical blowing agent. In some embodiments, based on the type of blowing agent, other gas concentrations, e.g., more than 0.5 percent by weight, may be possible. Such supercritical gas may be injected into the molten polymer at high pressure, for example, greater than 34 bar, inside the said cavity transfer mixer. The supercritical gas used in the process can be either nitrogen, carbon dioxide, or a mixture of nitrogen and carbon dioxide. In some embodiments, the supercritical blowing agent can be introduced inside the mixing section of the extruder, or inside the said cavity transfer mixer, at the injection pressure greater than or equal to 34 bar; in some cases, greater than or equal to 70 bar; in some cases, greater than or equal to 240 bar, and, in some cases, greater than or equal to 380 bar. The temperature of the mixer could be accurately controlled within ±1° C. The inclusion of a tiny amount of the said supercritical gas can offer a few essential advantages in the processing and, for example, foam sheet extrusion processes. For example, the gas may reduce the backpressure, which allows processing at higher throughput and can delay some instabilities in the foam processing, for example, melt fracture, or corrugation may be reduced. Also, the said supercritical gas can enhance the processing ability of the PET at a far lower temperature compared to the PET's conventional processing temperature, e.g., in some cases, at a temperature lower than the melting temperature of PET and higher than the crystalization temperature of PET, and in some cases, at a temperature in the range of 15% lower than the melting temperature and 15% higher than the melting temperature, since the said physical blowing agent can plasticize the molten PET and manipulates the rheological properties.

In some embodiments, the addition of the physical blowing agent can depress the development of the melt fracture due to the viscosity manipulation of the melt, which may result in high surface smoothness, e.g., average Sheffield smoothness, according to TAPPI T 538, of less than 100. Hence, the printing quality on the sheet may be improved significantly.

In some embodiments, the said physical blowing agent comprises nitrogen, carbon dioxide, or a mixture of nitrogen and carbon dioxide. It should be understood that the use of other types of physical blowing agents may be possible.

In some embodiments, the process of producing the multilayer PET foam sheet comprises using an extrusion die to form the multilayer PET foam sheet. In some embodiments, the die can be a multi manifold sheet die wherein the die geometry and specification may be manufactured according to, for example, the patent application U.S. 2012/0228793 A1, which is incorporated by reference herein in its entirety. In some embodiments the die may be a flat sheet die with a co-ex block wherein the die geometry and specification may be manufactured according to, for example, the patent application U.S. 2012/0228793 A1, which is incorporated by reference herein in its entirety. In some embodiments the multilayer PET foam sheet may be produced as a flat sheet with a thickness greater than 5 mils. In some embodiments, the multilayer PET foam sheet may be produced as a flat sheet with a thickness greater than 8 mils. In some embodiments, the multilayer PET foam sheet may be produced as a flat sheet with a thickness greater than 10 mils In some embodiments the method of producing multilayer PET foam sheet comprises the inclusion of some appropriate amounts of other additives in at least one of the extruders in said co-extrusion system, such as pigments, slip agents, antistatic agents, U.V. stabilizers, impact modifiers, antioxidants, and nucleating agents.

In some embodiment, the method of producing the multilayer PET foam sheet described herein comprises the inclusion of some appropriate amount of an inorganic additive, an organic additive, or a mixture of an inorganic and an organic additive as a nucleating agent with a concentration of 0.05 to 15 percent by weight, in some cases, a concentration of 0.1 to 12.5 percent by weight, in some cases, a concentration of 0.25 to 12.5 percent by weight, in some cases, a concentration of 0.5 to 10 percent by weight, in some cases, a concentration of 1 to 10 percent by weight, in some cases, a concentration of 1 to 7.5 percent by weight, in some cases a concentration of 2.5 to 7.5 percent by weight, optionally in at least one of the extruders in said co-extrusion system, for example, up to about 15% by weight of talc as a nucleating agent. In some cases, up to about 35 wt % of the said additives, e.g., calcium carbonates, might be included in at least one of the said extruders.

In some embodiments, the method of producing the multilayer PET foam sheet comprises the enhancement of the perceived surface whiteness of the sheet, which can be realized by the method explained according to the U.S. patent application Ser. No. 17/064,976, which is incorporated by reference herein in its entirety.

In some embodiments the bending stiffness and the layer configuration of the disclosed multilayer foamed sheet product could be optimized by the method and the products explained according to the patent application US20200361184A1 which is incorporated by reference herein in its entirety, and, in some cases, according to the patent application US20200361185A1 which is incorporated by reference herein in its entirety.

Herein a recyclable lightweight multilayer foam sheet is disclosed which, in some embodiments, comprises no less than three layers, e.g., four layers, to be widely used in the packaging industry, e.g., a replacement for paper boards that are being used in packaging industries, and in some cases, for direct and non-direct food contact packaging application. The sheet comprises recycled flakes produced from recycled PET sources, post-industrial waste, process regrind, and post-consumer regrind, e.g., post-consumer PET bottle flakes, wherein at least one layer, excluding the solid skin layers, has a cellular structure. In some embodiments, at least 10% of the cells are closed-cell; in some embodiments, more than 50% of the cells are closed cells; and, in some embodiments, more than 75% of the cells are closed cells. As used herein, a "closed cell" refers to a cell that has cell walls that completely surround the cell with no openings such that there is no interconnectivity to an adjacent cell. The percentage of the closed cells may be measured according to ASTM D6226-15.

In some embodiments, the mass concentration of the virgin PET in every unit area of the multilayer sheet is less than 15 percent of the mass of the unit area of the sheet. In some embodiments, the mass concentration of the virgin PET in every unit area of the multilayer sheet is less than 10 percent of the mass of the unit area of the sheet. In some embodiments, the mass concentration of the virgin PET in every unit area of the multilayer sheet is less than 5 percent of the mass of the unit area of the sheet.

In some embodiments, the multilayer foamed sheet products described herein can exhibit significantly higher moisture barrier properties compared to their solid counterparts with the same value of mass per unit area (in gram per meter squared). Also, in some embodiments, the multilayer foamed sheet products described herein can exhibit significantly higher oxygen barrier properties compared to their solid counterparts with the same value of mass per unit area (in gram per meter squared). Such higher moisture and oxygen barrier properties may be achieved because of a higher degree of crystallinity due to the faster crystallization kinetics of the said PET feedstock with a low I.V. compared to the crystallization kinetics of virgin PET grades with a higher I.V. of about 0.9 and higher.

In some embodiments, the multilayer foam sheet comprises five layers; in some embodiments, four layers; and, in some embodiments, three layers. For example, a five-layer sheet may comprise a foam core layer (e.g., comprising rPET) and at least two solid layers (e.g., comprising PET), each one on respective opposite sides of the core layer, and at least one solid layer (e.g., comprising rPET), each one between the foam layer and solid skin layer. In one embodiment, the five-layer sheet may comprise a solid core layer (e.g., comprising rPET) and at least two solid layers (e.g., comprising PET), each one on respective opposite sides of the core layer, and at least two foam layers (e.g., comprising rPET), each one between the core layer and solid skin layer.

In some cases, a four-layer sheet may comprise a foam core layer (e.g., comprising rPET) and two solid layers (e.g., comprising rPET), each one on respective opposite sides of the core layer, and one solid layer (e.g., comprising PET) on one side of the core layer.

In some cases, a three-layer foam sheet comprises a foam core layer (e.g., comprising rPET) in the middle with two solid skin layers (e.g., comprising PET), each one on the respective opposite side of the core layer.

In another embodiment, the multilayer foam sheet, comprises at least one foam layer (e.g., comprising rPET), and at least two solid layers (e.g., comprising PET), and at least one solid layer (e.g., comprising EVOH). In some other embodiments, the multilayer foam sheet described herein comprises at least one solid layer comprising EVOH.

It should be understood that other layer configurations may be possible.

In some embodiments, the I.V. of the resin in one or more of the solid layers is at least 0.1 dL/g more than the I.V. of the resin in the foam layers. In some embodiments, the I.V. of the resin in one or more of the solid layers is at least 0.15 dL/g more than the I.V. of the resin in the foam layers. In some embodiments, the I.V. of the resin in one or more of the solid layers is at least 0.2 dL/g more than the I.V. of the resin in the foam layers. In some embodiments, the I.V. of the resin in one or more of the solid layers is at least 0.25 dL/g more than the I.V. of the resin in the foam layers. In some embodiments, the I.V. of the resin in one or more of the solid layers is at least 0.3 dL/g more than the I.V. of the resin in the foam layers. In some embodiments, the I.V. of the resin in one or more of the solid layers is at least 0.35 dL/g more than the I.V. of the resin in the foam layers.

In some embodiments, at least one of the outmost solid layers comprises a virgin PET resin, wherein the I.V. of the said resin is at least 0.1 dL/g more than the I.V. of the rPET resin that is used in the foam layers; in some cases, 0.15 dL/g more; in some cases, 0.2 dL/g more; in some cases, 0.25 dL/g more; in some cases, 0.3 dL/g more; in some cases, 0.35 dL/g more; in some cases, 0.4 dL/g more; in some cases, 0.45 dL/g more; and in some cases, 0.5 dL/g more than the I.V. of the rPET resin that is used in the foam layers.

In some embodiments, the polymer composition of each layer comprises some appropriate amounts of other additives, such as, but not limited to, pigments, slip agents, antistatic agents, U.V. stabilizers, antioxidants, impact modifiers or nucleating agents. The foam layer optionally may contain 0.05 to 15 percent by weight of an inorganic additive, an organic additive or a mixture of an inorganic and an organic additive as a nucleating agent. For example, the foam layer may contain up to about 15% by weight of talc as a nucleating agent. In some cases, at least one layer of the sheet may contain up to about 35 wt % of calcium carbonates; in some cases, up to about 30 wt %, in some cases, up to about 25 wt %; in some cases, up to about 20 wt %; in some cases, up to about 15 wt %; in some cases, up to about 10 wt %; and in some cases, up to about 5 wt %.

In some cases, a multilayer foam sheet comprises two solid skin layers wherein at least one of the skin layers comprises an appropriate amount of color pigments, for example, less than 1 percent by weight.

The described multilayer foam sheet, comprising at least one foam layer, may have sets of significantly improved physiomechanical properties compared to known similar foamed sheet articles as in particular the bending stiffness value of greater than 20, in some cases greater than 25, and in some cases, greater than 50, all in Taber stiffness unit configuration, according to TAPPI/ANSI T 489 om-15. In some embodiments, the ratio of the mass per unit area (the mass of a unit area of the sheet in gram per meter-squared ($gr/m^2$)) over the stiffness value in Taber unit configuration is equal to or less than 25; in some cases, less than 20, and, in some cases, less than 15. In an embodiment, the sheet can have a Taber bending stiffness value of less than 280, according to TAPPI/ANSI T 489 om-15.

The described multilayer foam sheet can have a surface with an average Sheffield smoothness, according to TAPPI T 538, of less than 100. In some embodiments, the sheet may have an average Sheffield smoothness of less than 50; in some cases, less than 40; in some cases, less than 30; and, in some cases, less than 15.

In some embodiments, the foam layer of the disclosed sheet has a far better cellular morphology compared to the known similar sheets. For example, the foam layers of the disclosed sheets can have uniformly distributed cells, for example, with a closed-cell morphology, with an average cell size of about 10-250 μm. In some embodiments, the average cell size in the foam layer of the multilayer PET foam sheet is less than 200 μm. In some embodiments, the average cell size in the foam layer of the multilayer PET foam sheet is less than 100 μm.

In some embodiments, the average cell density with respect to the un-foamed polymer volume in the foam layer of the multilayer PET foam sheet is about $10^2$-$10^9$ cells/cm$^3$. In some embodiments, the average cell density with respect to the un-foamed polymer volume in the foam layer of the multilayer PET foam sheet is less than about $10^8$ cells/cm$^3$. In some embodiments, the average cell density with respect to the un-foamed polymer volume in the foam layer of the multilayer PET foam sheet is less than about $10^7$ cells/cm$^3$.

In some embodiments, the expansion ratio of the foam layer of the multilayer PET foam sheet is less than 9. In some embodiments, the expansion ratio of the foam layer of the multilayer PET foam sheet is less than 8. In some embodiments, the expansion ratio of the foam layer of the multilayer PET foam sheet is less than 7. In some embodiments, the expansion ratio of the foam layer of the multilayer PET foam sheet is less than 6. In some embodiments, the expansion ratio of the foam layer of the multilayer PET foam sheet is less than 5. In some embodiments, the expansion ratio of the foam layer of the multilayer PET foam sheet is less than 4. In some embodiments, the expansion ratio of the foam layer of the multilayer PET foam sheet is less than 3. In some embodiments, the expansion ratio of the foam layer of the multilayer PET foam sheet is less than 2. In some embodiments, the expansion ratio of the foam layer of the multilayer PET foam sheet is less than 1.1.

In some cases, the foam layer comprises at least 10% closed cells and, in some cases, more than 50% closed cells. In one embodiment, the foam layer has a substantially entirely closed-cell morphology (e.g., greater than 95% closed cells). The percentage of the closed cells may be measured according to ASTM D6226-15.

The present disclosure relates to multilayer lightweight PET foam sheet suitable to be used in all sorts of non-aseptic and aseptic packaging; packaging of all kinds of oxygen-sensitive products, packaging of pasteurized products; packaging of dry food products such as biscuits, cookies, cereals, tea, coffee, sugar, flour, dry food mixes, chocolates, sugar confectionaries, pet food; packaging of frozen foods such as chilled foods and ice creams; packaging of cooked and precooked products and foods; packaging of fresh products such as vegetables, fruits, meat and fishes; packaging of baby foods; packaging of all kinds of desserts; packaging of pourable food and beverages such as broths, soups, juice drinks, milk and all sorts of products derived from milk, concentrates, all kinds of dressing, liquid eggs, tomato products; and packaging of all kinds of flowable non-edible products such as laundry detergents, shampoos, and body washes; and packaging of pet foods.

The invention claimed is:

1. A method of making a multilayer foam sheet comprising:

providing a co-extrusion system comprising at least two single screw extruders;

feeding low I.V. polyester feedstock comprising polyester flakes from recycled sources, wherein up to 100% of the polyester in the feedstock comprises polyester flakes from recycled sources, into one of the extruders, wherein the low I.V. polyester feedstock has an intrinsic viscosity (I.V.) of lower than 0.8 dL/g as measured by ASTM D4603-18;

introducing supercritical physical blowing agent into melted polyester feedstock in at least one of the extruders;

processing the polyester feedstock at a processing temperature in the range of 15% lower than the melting temperature and 15% higher than the melting temperature; and coextruding the feedstock from the extruders of the co-extrusion system through a flat sheet die to make a multilayer foam sheet, wherein at least one layer is a foam layer comprising low I.V. polyester.

2. The method of making a multilayer foam sheet of claim 1, wherein at least one of the extruders of the co-extrusion system comprises a cavity transfer mixer comprising a gas injection port through which the physical blowing agent is introduced, and the temperature of the mixer is maintained at a temperature in the range of 15% lower than the melting temperature and 15% higher than the melting temperature of the low I.V. polyester feedstock.

3. The method of making a multilayer foam sheet of claim 1, comprising building pressure inside the cavity transfer mixer up to at least 200 bar.

4. The method of making a multilayer foam sheet of claim 1, wherein the physical blowing agent comprises nitrogen, carbon dioxide, or a mixture of nitrogen and carbon dioxide.

5. The method of making a multilayer foam sheet of claim 1, comprising introducing the physical blowing agent, with an injection pressure of more than 240 bar at a concentration of less than 1 weight percent, into the polyester feedstock inside a mixing section of at least one of the extruders in the said co-extrusion system to form a mixture of blowing agent and the polyester feedstock.

6. The method of making a multilayer foam sheet of claim 1, wherein the polyester feedstock further comprises at least one of color pigments, slip agents, antistatic agents, U.V. stabilizers, impact modifiers, antioxidants, or nucleating agents.

7. The method of making a multilayer foam sheet of claim 1, wherein the foam layer has an average cell size of 10 to 100 μm and comprises a nucleating agent.

8. The method of making a multilayer foam sheet of claim 1, wherein the foam layer comprises a nucleating agent with a concentration of 0.05 to 15 percent by weight and the nucleating agent comprises an inorganic additive, an organic additive, or a mixture of an inorganic and an organic additive.

9. The method of making a multilayer foam sheet of claim 1, wherein a virgin PET feedstock is used in at least one of the extruders in the co-extrusion system wherein the mass concentration of the virgin PET in every unit area of the produced multilayer sheet is less than 15 percent of the mass of the unit area of the sheet.

10. The method of making a flat multilayer foam sheet of claim 1, wherein the resin used in one or more of the solid layers has an I.V. that is at least 0.1 dL/g more than an I.V. of the resin used in the foam layers.

11. The method of making a flat multilayer foam sheet of claim 1, wherein the resin used in at least one of the outmost solid layers has an I.V. that is at least 0.1 dL/g more than an I.V. of the resin used in the foam layers.

* * * * *